(12) United States Patent
Hutterly et al.

(10) Patent No.: US 6,662,979 B2
(45) Date of Patent: Dec. 16, 2003

(54) LAUNDRY APPARATUS

(76) Inventors: John Hutterly, 719 Wedge Dr., Naples, FL (US) 34103; William V. Fries, 214 Grapewood Ct., Marco Island, FL (US) 14145

( * ) Notice: Subject to any disclaimer, the term of this patent is extended or adjusted under 35 U.S.C. 154(b) by 0 days.

(21) Appl. No.: 09/755,426

(22) Filed: Jan. 5, 2001

(65) Prior Publication Data

US 2003/0019891 A1 Jan. 30, 2003

Related U.S. Application Data

(60) Provisional application No. 60/212,983, filed on Jun. 21, 2000.

(51) Int. Cl.[7] .............................................. A41H 43/00
(52) U.S. Cl. .......................................... 223/51; 414/13
(58) Field of Search ............................ 223/51; 414/13; 198/680, 682, 685, 686, 687

(56) References Cited

U.S. PATENT DOCUMENTS 4,873,878 A * 10/1989 Milton ...................... 73/865.8

* cited by examiner

*Primary Examiner*—John J. Calvert
*Assistant Examiner*—James G Smith
(74) *Attorney, Agent, or Firm*—Allen D. Brufsky

(57) ABSTRACT

Trousers and/or shorts are fed one at a time between conveyor belts, cuff end first, towards a hanger automatically dropped from a hanger bar into a hanger chute positioned in the path of travel of the trousers. A sensor senses the presence of a pair of trousers on the feed belts and activates a hanger transport mechanism which grabs a hanger from the end of a screw conveyor on a hanger bar feeding the hangers by gravity towards the screw end, which stops, separates and spaces the hangers. The hanger transport mechanism delivers a hanger forwardly over the hanger chute, and then retracts, dropping the hanger into chute. The cuffs of the trousers are fed through the hanger positioned in the chute. A sensor, such as a photoelectric eye, senses the position of the waistband or the opposite end of the trousers and upon sensing the same, causes the activation and forward tilt or rotation of a hanger receiving and holding mechanism mounted at the bottom of the hanger chute, which enables the trousers to be draped over the hanger and the hanger to be delivered to an upright conveyor or other device containing spaced projections for picking up the hanger hook end along with the folded trousers, and transporting the same for further processing.

15 Claims, 5 Drawing Sheets

LAUNDRY APPARATUS

CROSS-REFERENCES TO RELATED APPLICATIONS

This application claims priority from provisional patent application, Ser. No. 60/212,983, filed Jun. 21, 2000.

BACKGROUND OF THE INVENTION

1. Field of the Invention

This invention relates to apparatus useful in the laundering of industrial garments, and more particularly, apparatus for automatically conveying trousers folded on a hanger to and through a steam tunnel to remove the wrinkles from the trousers after they have been washed or to another location for further processing.

2. Description of the Prior Art

Conventional apparatus and methods for use in transporting trousers in bulk through a steam tunnel to remove wrinkles from the washed trousers have consisted mainly of straightening and manually folding the trousers on a hanger, placing and orienting the hangers one at a time vertically on a conveyor leading to the steam tunnel where they are heated by steam to remove wrinkles. An example of such an apparatus is that sold by Colmac Industries, Inc. of Colville, Wash. The process is time consuming and labor intensive, in that individual trousers must be handled, folded and hung, but once hung vertically, the hangers have a tendency to intertwine or cross as they are fed by the conveyor, causing further down time to space them properly or else creating a jam as they are fed to the steam tunnel.

The apparatus of the present invention cuts the handling time in half.

SUMMARY OF THE INVENTION

In accordance with the present invention, the trousers and/or shorts of any width waistband are fed one at a time between conveyor belts, cuff end first, towards a hanger automatically dropped from a hanger bar into a hanger chute positioned in the path of travel of the trousers and/or shorts. A sensor senses the presence of a pair of trousers and/or shorts on the feed belts and activates a hanger transport mechanism which grabs a hanger from the end of a screw conveyor on a hanger bar feeding the hangers by gravity towards the screw end, which stops, separates and spaces the hangers. The hanger transport mechanism delivers a hanger forwardly over the hanger chute, and then retracts, dropping the hanger into chute. The cuff end of the trousers or shorts are fed through the hanger positioned in the chute. A sensor, such as a photoelectric eye, senses the position of the waistband or the opposite end of the trousers and upon sensing the same, causes the activation and forward tilt or rotation of a hanger receiving and holding mechanism mounted at the bottom of the hanger chute, which enables the trousers and/or shorts to be draped over the hanger and the hanger to be delivered to an upright conveyor containing spaced projections for picking up the hanger hook end along with the folded trousers and/or shorts, and transporting the same to the steam tunnel conveyor or other device for further processing. As a consequence, the waistband is always at the same location after the trousers are folded for further processing The screw conveyor at the end of the hanger bar separates, and rotatable arcuate knives upstream from the conveyor end, spaces the hangers on the conveyor to prevent them from crossing and jamming in the apparatus. The hanger transport mechanism is activated at periodic selected intervals and is positioned adjacent to the hanger bar to grab individual hangers from the end of the screw conveyor and retract to drop the hanger by gravity into the chute.

A further sensor, placed at the feed end of the conveyor belts, automatically senses the cuff end of the trousers and/or shorts and adjusts the width of the entrance to the belts for assuring that the trousers and/or shorts are centered so that the position of the waistband can subsequently be read for activation of the hanger tilt mechanism.

BRIEF DESCRIPTION OF THE DRAWINGS

Further objects and advantages of the invention will become apparent from the following description and claims and from the accompanying drawings, wherein:

DETAILED DESCRIPTION OF THE PREFERRED EMBODIMENT

Figure 1:
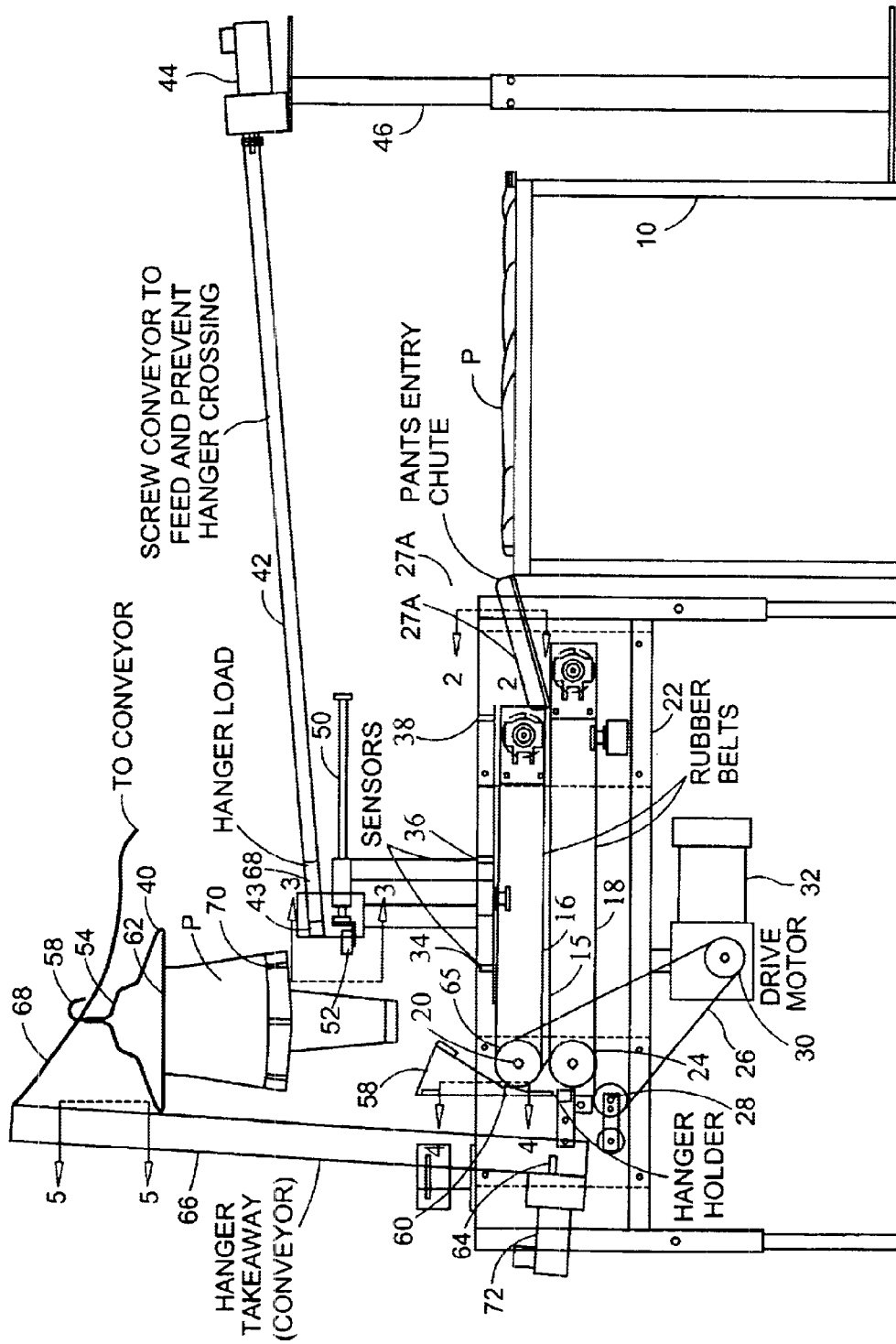
FIG. 1 is a schematic representation illustrating the components and the operation of the overall laundry apparatus of the present invention.
Figure 2:
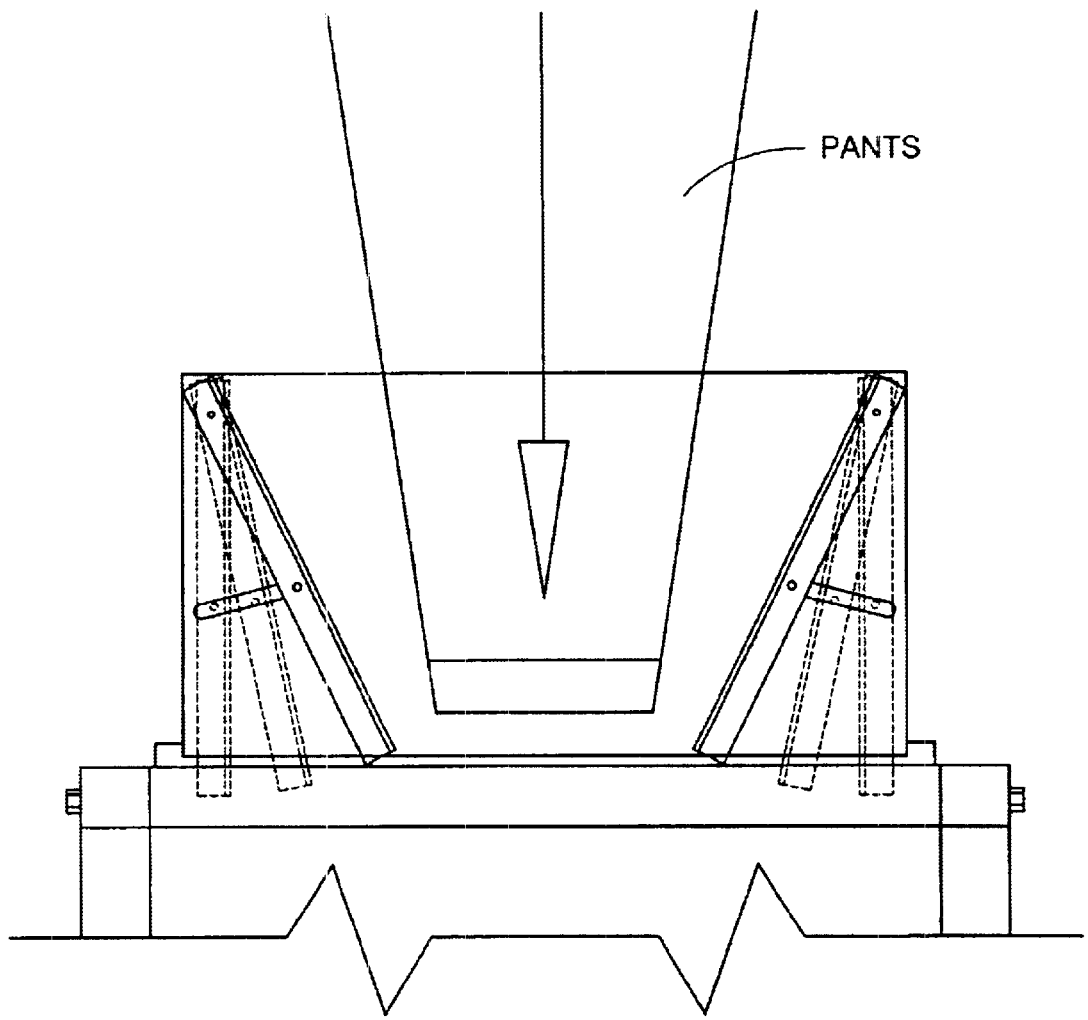
FIG. 2 is a view taken substantially along the plane indicated by the line 2—2 of FIG. 1 and illustrating the feed chute and feed belts of the laundry apparatus of FIG. 1 and the manner of adjusting the feed chute to accommodate different size waistbands of trousers and/or shorts.
Figure 3:
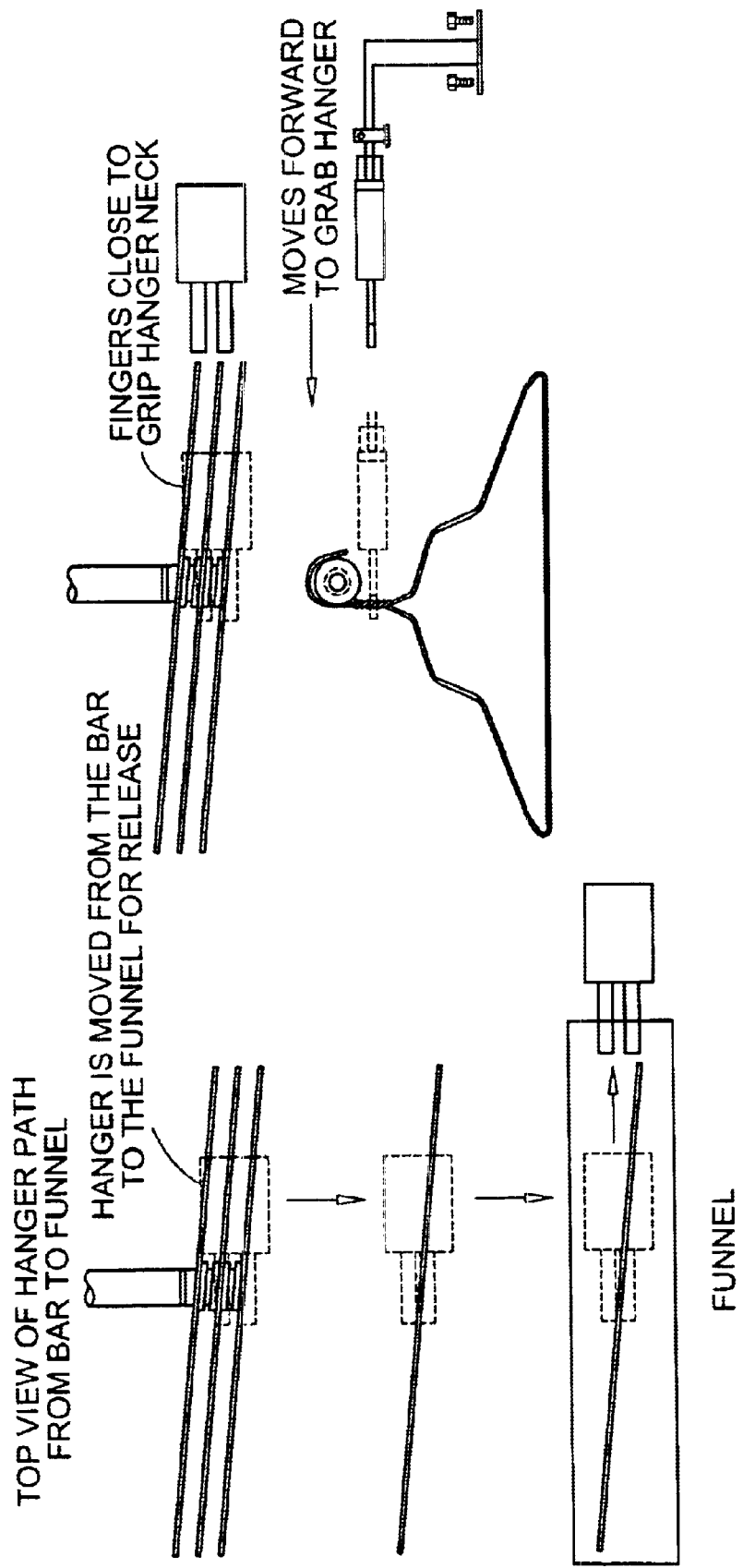
FIG. 3 is a view taken substantially along the plane indicated by line 3—3 of FIG. 1 and illustrating in detail the end of the hanger bar and the hanger transport mechanism and schematically, the manner of transporting a hanger to a hanger-receiving chute or funnel; and further illustrating schematically the manner of grasping the hanger for transport.

Referring now to the drawings in detail, wherein like numerals indicate like elements throughout the several views, pants, shorts, or trousers P stacked on a table 10 are fed by the operator of the apparatus 12 down a chute 14, onto the top run 15 of a pair of spaced belts 16, and then between a pair of spaced rubber belts 18 overlying belts 16. The chute 14 is adjustable in width, having angle iron sides 17, 19 connected for angular movement in arcuate slots 21 on the chute base surface 23. A further sensor 38, placed at the feed end of the conveyor belts, automatically senses the cuff end of the trousers and/or shorts and adjusts the width of the entrance to the belts for assuring that the trousers and/or shorts are centered so that the position of the waistband can subsequently be read for activation of the hanger tilt mechanism. When the cuffs are sensed, the chute sides 17, 19 are rotated (e.g., by a hydraulic toggle linkage, not shown) to open or close the chute end.

The operator straightens and smoothes the pants P before feeding them, cuffs first, between belts 16, 18. The bottom runs of rubber belt 16, and the top runs of belt 18 are parallel and spaced and are adapted to travel in the same direction towards the distal end of the apparatus 12. In order to accomplish this, the belts 16 are driven in a clockwise direction as viewed in FIG. 1 by a roller 20 mounted on the frame 22 of apparatus 12, while belts 18 are driven in a counterclockwise direction by a roller 24 on frame 22.

Rollers 20 and 24 are rotated by a belt 26 maintained under tension by a roller 28 and connected between a driven pulley 30 rotated by a drive motor 32 mounted on frame 22 and drive pulleys on the end of the shafts of rollers 20 and 24. The belts 16 and 18 are actually comprised of two spaced side by side portions, permitting a plurality of sensors 34, 36, and 38, such as photoelectric eyes, to sense the location of a portion of the pants or trousers being conveyed between belts 16, 18, for example, the waistband, and the absence of any trousers on a portion of the feed belts 16, 18, for a purpose to be described hereinafter.

A plurality of triangular wire hangers 40 are adapted to be disposed by the operator on a hanger bar 41 having a screw conveyor portion 42 at one end and rotating spaced partially arcuate knives 43 upstream from the screw conveyor 42. The screw conveyor 42 and spacer knives 43 are rotated by a motor 44 on a vertically adjustable stand 46 and are mounted between the end of motor 44 and a bracket 48 so as to be downwardly sloped relative to frame 22. The amount of slope aids in determining the rate of drop of each hanger along the bar 41 by gravity, particularly where portions of the rotating bar are unthreaded, as may be the case where it is desired to adjust the rate of feed along the conveyor. The threaded portions 42 and knives 43 however, serve to space the hangers from each other along the length of the bar 41 to prevent the hangers from becoming crossed or intertwined, jamming the hangers as they are fed along the bar.

Figure 4:
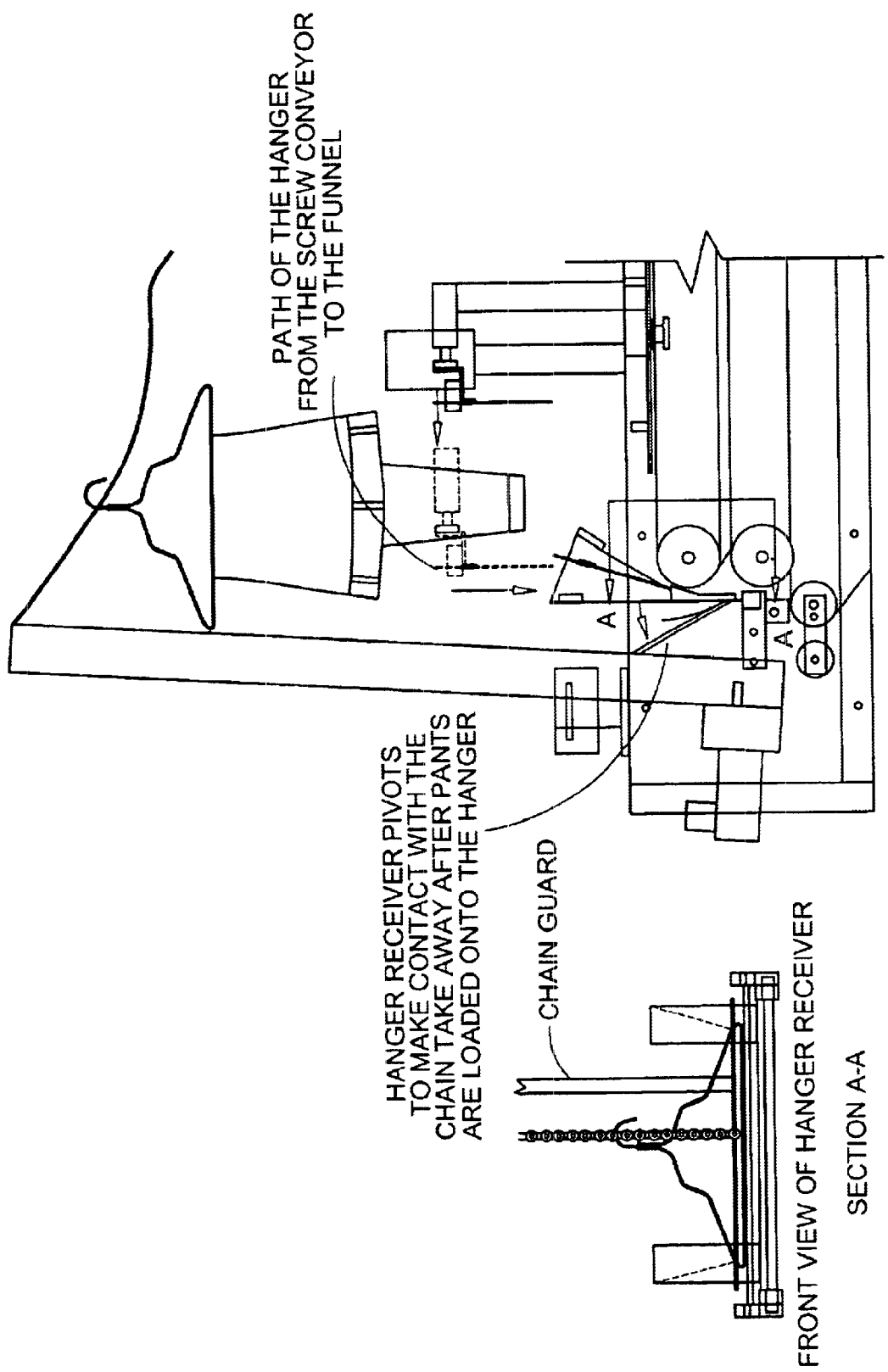
FIG. 4 is an enlarged view of the left hand end of the apparatus of FIG. 1, and illustrating the hanger chute and holding mechanism.
Figure 5:
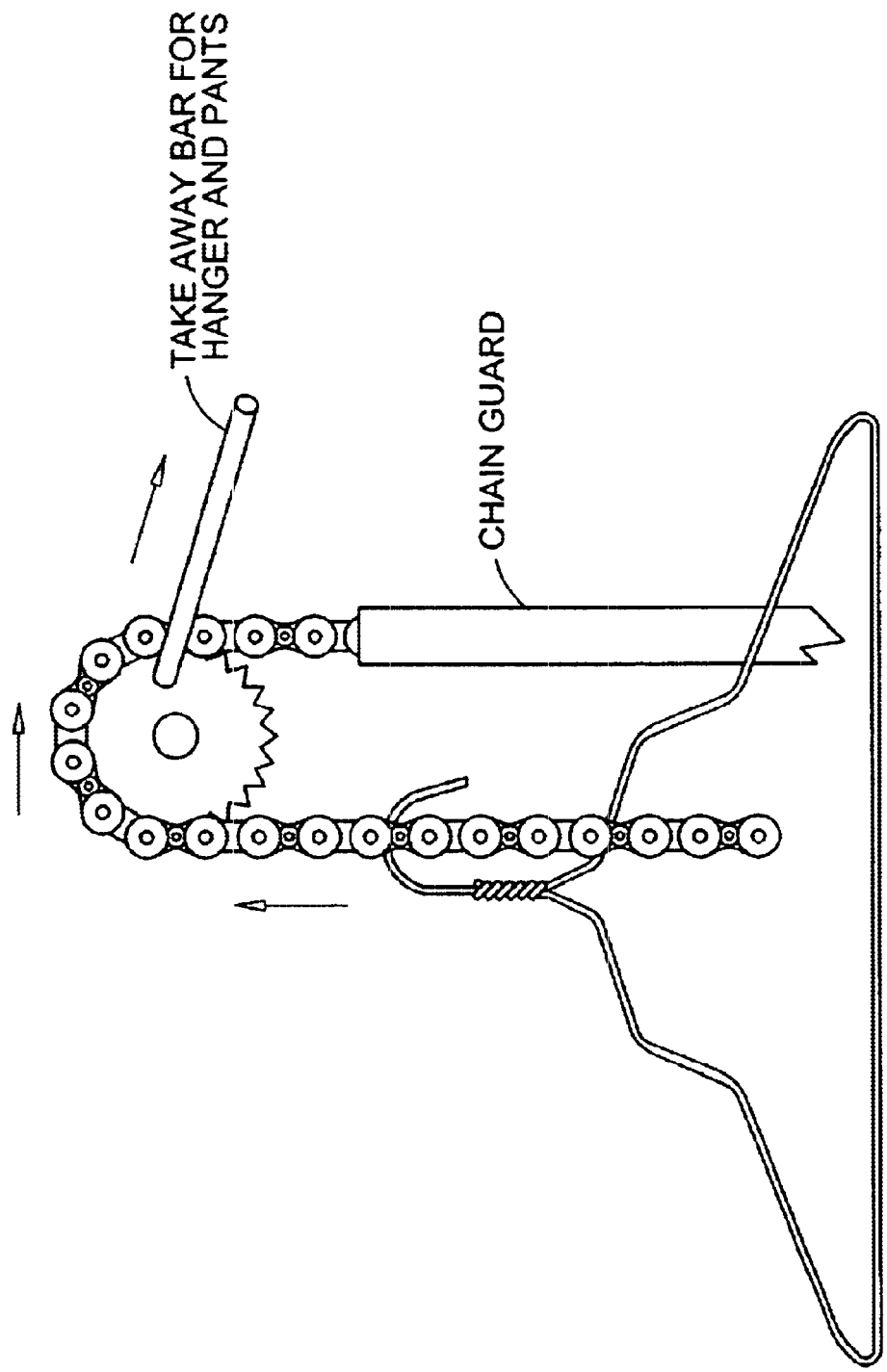
FIG. 5 is a view taken substantially along the plane indicated by line 5—5 of FIG. 1, and illustrating the hanger takeaway conveyor.

Referring specifically to FIGS. 1, 3, 3A, and 3B, individual ones of the hangers 40 are seated at periodic intervals on the end 52 of an hydraulic piston or pushrod 50. When a pair of trousers is sensed by sensor 34 on the belts 16, the spaced fingers 51, 53 are extended by hydraulic means, such as cylinders 55 and closed by a toggle linkage (not shown) to grab the neck or juncture 54 of one of the hangers 40 at the end of screw conveyor 42 and clamp the same therebetween. The pushrod 50, then is activated to push the grasped hanger 40 to a position above a conical hanger chute 58 (see FIG. 3) in communication with and terminating in a hanger receiver and holder 60, spanning the space between the top and bottom runs of belts 16, 18 and having an opening 61 in line with (See FIG. 4A) the space between the belt runs. Upon retraction of the spaced fingers 51, 53 (See FIG. 3) and pushrod 50, the hanger 40 seated on end 52 will fall by gravity into chute 58 and be held in holder 60 against and in contact with a pair of spaced paddles 65, 67 fixed to a horizontal and rotatable rod 69. Rod 69 is rotatable by a motor (not shown) upon sensing of the pants or trouser waistband by sensor 36 to tilt the paddles 65, 67 forward or counterclockwise as viewed in FIG. 4 to present the hook 56 on hanger 40 to a projection 64 on upright hanger takeaway conveyor 66.

The pants P between the runs of belts 16, 18 will enter the holder 60 and be draped over the horizontal hanger bar 62 of hanger 40. Before the next pair of pants or trousers P is advanced the hanger hook 56 is engaged by a pin or projection 64 extending outwardly from a chain link on an upright, adjustably tiltable conveyor 66 or hanger takeaway 66 and positioned on a slide 68 connected to the conveyor going through the steam tunnel. The sensor 38 can be used to sense the passage of the trousers from the belts 16, 18 and activate the motor, which drives takeaway conveyor 66. In lieu of a conveyor 66, the takeaway can consist of a pneumatic and hydraulically activated device for gripping the hanger or thrusting a pin into the hanger neck.

The sensors 34, 36, and 38 can be used to perform a variety of functions. First, the sensor 34 can be used to determine the presence of a garment between the belts 16, 18. In response thereto, the pushrod 50 can be activated to dispense a hanger 40 into chute 58. The sensor 36 can be used to sense the presence of the waistband 70 on trousers or pants P to initiate tilt of the hanger holding and receiving mechanism. The sensor 38 can be used to determine the absence of any pants P on the belts 16, 18 or to adjust the width of the chute sides 17, 19 in combination with not sensing the cuff end of the pants P to activate the drive motor to initiate movement of the takeaway conveyor 66. By sensing the absence of the cuff end of the pants to initiate the takeaway conveyor 66, the apparatus 12 can be used with any length of trousers, even shorts. The sensor 36 assures draping of the pants P with its waistband always at the same location over the hanger, so a bar code on the waistband can be read for further automatic processing function.

We claim:

1. An apparatus for folding trousers and transporting the trousers to a steam tunnel comprising:
   (a) means for feeding said trousers through a hanger for carrying and folding said trousers,
   (b) means for positioning a hanger in the path of said feeding means and draping said trousers over said hanger in response to sensing a pair of trousers on said feeding means, and
   (c) means for transporting said trousers for further processing after they are folded and draped over said hanger.

2. The apparatus of claim 1 wherein said feeding means comprises conveyor means for engaging the legs of said trousers.

3. The apparatus of claim 1 wherein said means for positioning a hanger in the path of said feeding means includes:
   a bar for gravitationally feeding said hangers sequentially towards said feeding means, and
   means for grasping and transporting a hanger sequentially fed along said bar towards said feeding means and dropping said hanger into a hanger holding means disposed in the path of movement of said feeding means.

4. The apparatus of claim 3 wherein said bar includes a screw conveyor for spacing said hangers and feeding them sequentially towards said feeding means.

5. The apparatus of claim 1 wherein said hanger positioning means includes:
   means for holding said hanger stationary in the path of movement of said feeding means,
   means for sensing the trailing portion of said trousers on said feeding means, and
   means for tilting said hanger in response to sensing said trailing trouser portion on said feeding means to fold and drape said trouser on said hanger.

6. The apparatus of claim 1 including
   means for sensing a pair of trousers on said feeding means and initiating movement of said grasping means to contact said hanger to move the same to said hanger holding means.

7. The apparatus in accordance with claim 1 wherein said means for transporting said hanger includes a device having projections for engagement with said hanger.

8. The apparatus of claim 3 wherein said hanger holding means includes a chute having a conical opening for receiving said hanger, and at least one rotatable contact surface in the front of said chute for tilting said hanger in a direction towards said transporting means.

9. The apparatus of claim 7 wherein said hanger holding means includes a chute having a conical opening for receiving said hanger, and at least one rotatable contact surface in the front of said chute for tilting said hanger in a direction towards said transporting means.

10. The apparatus in accordance with claim 9 wherein said means for transporting said hanger includes a conveyor having projections for engagement with said hanger.

11. The apparatus of claim 10 wherein said means for positioning a hanger in the path of said feeding means includes:

a bar for gravitationally feeding said hangers sequentially towards said feeding means, and means for grasping and transporting a hanger sequentially fed along said bar towards said feeding means and dropping said hanger into a hanger holding means disposed in the path of movement of said feeding means.

12. The apparatus of claim 11 wherein said bar includes a screw conveyor for spacing said hangers and feeding them sequentially towards said feeding means.

13. The apparatus of claim 2 wherein said feeding means includes at least one pair of overlying belts for grasping and moving said trousers therebetween.

14. The apparatus of claim 13 including a chute for guiding said trousers to said feeding belts.

15. The apparatus of claim 14 wherein the width of said chute is adjustable.

\* \* \* \* \*